A. R. THOMPSON.
METHOD OF PEELING FRUIT.
APPLICATION FILED JULY 5, 1921.
1,389,796.
Patented Sept. 6, 1921.
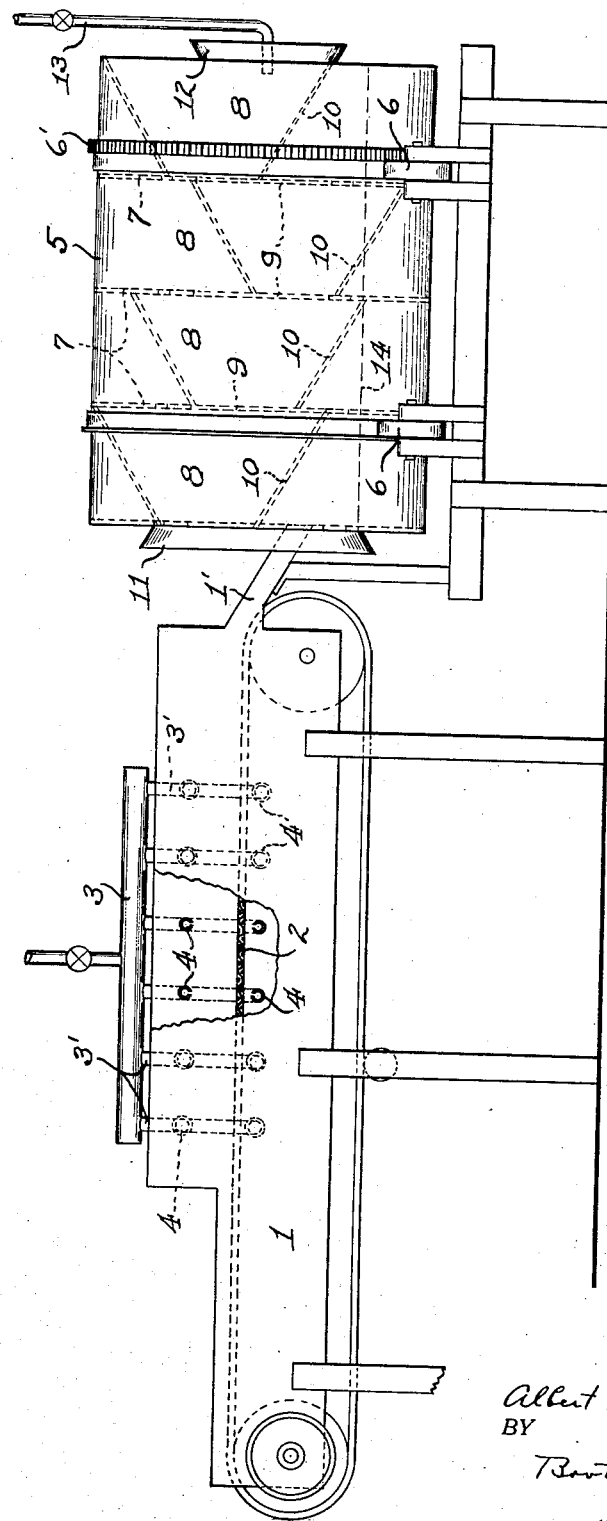
INVENTOR,
Albert R. Thompson
BY
Booth & Booth,
ATTORNEYS though the specific reference is given in respect to this type, the inventions is not in any manner dependent thereon.

UNITED STATES PATENT OFFICE.

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

METHOD OF PEELING FRUIT.

1,389,796.     Specification of Letters Patent.     Patented Sept. 6, 1921.

Application filed July 5, 1921. Serial No. 482,455.

*To all whom it may concern:*

Be it known that I, ALBERT R. THOMPSON, a citizen of the United States, residing at San Jose, in the county of Santa Clara and State of California, have invented certain new and useful Improvements in Methods of Peeling Fruit, of which the following is a specification.

My invention relates to the art of removing the peel or skin of fruit, preparatory to canning, and particularly to those methods or processes which comprise an initial step of softening or disintegrating the skin, followed by a washing step to remove said skin.

While applicable to any fruit having a relatively tender skin, and flesh of such a rapidly oxidizable nature that exposure to the air, after the initial treatment and the removal of the protecting skin will quickly cause unsightly discoloration, my invention is particularly applicable to and intended for the peeling of pears; and in this connection I shall herein describe it.

The skin of pears is very tender and is capable of being softened by subjection to heat, the simplest form of the application of which is through the medium of steam. But this subjection to moist heat has such an effect upon the flesh, that when taken in connection with the subsequent step of the removal of the softened skin by means of clear water, such as is usually employed in processes of this general nature, the peeled pears discolor so quickly that it is almost, if not quite impossible to can them, before they oxidize; and this, especially in the case of pears, the pure whiteness of which is essential to marketability, presents a serious difficulty in the application of accepted methods and processes of rapid, effective and economical peeling and canning.

It is the object of my present invention to overcome this difficulty by providing a method of peeling such fruit as pears, which method, while in harmony with modern practice in the canning art, will nevertheless prevent the discoloration of the peeled fruit and will preserve their pure and acceptable whiteness for a period ample to cover the time which must practically elapse between the completion of the peeling process and the placing of the peeled fruit in the cans.

To this end my invention consists in the novel method of peeling fruit which I shall now fully describe.

My method may be carried out in any suitable apparatus providing for the subjection of the fruit to the successive steps of the method. For the sake of illustration, I have, in the accompanying drawings, shown somewhat diagrammatically one form of an apparatus adapted for my method.

In these drawings the figure is a side elevation, broken in part, of the apparatus.

1 is a box, through which passes an endless traveling wire mesh carrier 2. Outside the box is a steam-header 3, with branches 3' from which extend into and transversely of the box a plurality of steam-jet, apertured or slitted pipes 4, in two tiers, one above, and one below the carrier. This box as here shown may illustrate conventionally the type of an apparatus now well known in the art as a tomato-scalder and it represents herein what may be termed the initial heating and skin softening effect of my method. Communicating directly with the discharge end of the scalding or heating box 1, as by means of the chute 1', is the tank or drum 5 of what may be termed the washing or skin-removing effect of my method. This drum is mounted for rotation on its axis upon supporting rolls 6, and is revolved by power applied to a circumferential gear 6'. The drum as shown by the dotted lines, is interiorly divided by perforated partitions 7 into a plurality of compartments 8, successively communicating through openings 9 in the partitions lying in the axis of the drum. In each compartment is a lifting volute flange 10 by which the fruit is picked up and discharged through the axis openings 9 into the successive compartments. The fruit is received directly from the chute 1' of the box 1, through a feed hopper 11 and delivered to the first compartment of the drum 5. From the last compartment the fruit is delivered to a discharge chute 12. Into the last compartment of the drum 5 a pipe 13 delivers the washing liquid and this liquid lies as a body indicated by 14 in the lower portion of the drum and flows constantly, through the perforated partitions 7, in a direction counter to that in which the fruit is advanced, and finally passes from the first compartment into a waste receptacle, not shown, at the head of the drum.

In general, this washing drum represents the type of fruit washer disclosed in my Patent No. 1,352,393, Sept. 7, 1920, and is herein illustrated conventionally as being well adapted for my present method.

One essential distinction must, however, be here pointed out, to wit that my present method involves the use of an aqueous saline solution as the washing or skin-removing liquid, and it must, therefore, be understood that the pipe 13 furnishes such saline solution to the drum and that the body of flowing liquid 14 passing through the drum is an aqueous solution of salt.

The salt I prefer to use is common salt (NaCl). The strength of the solution may vary, but as an example I may give an 8% solution though any one skilled in the art will know what strength to employ.

In carrying out my method, the pears are fed to the traveling carrier 2 and by it are carried into and through the box 1. In this box, the pears are subjected, from above and below, to the action of the steam jets from the pipes 4, and by the steam their skin is softened or disintegrated to such an extent that it can easily be washed off. The pears with their skin thus softened are passed continuously and directly into the drum 5. In this they are advanced from compartment to compartment, successively dropping into and passing through the counter-flowing body 14 of the saline solution. The softened skin is thus washed off or removed and when delivered from the foot of the drum the pears are fully peeled.

In this operation, the effect of the heat in the initial treatment is not only to soften the skin, but, for some reason, it also so effects the flesh as to render it extremely susceptible to discoloration. But by passing the fruit immediately and directly into the saline solution, this tendency is arrested, and postponed so that the flesh remains white not only in the washer effect, but for a length of time after the fruit has passed through the washer and is exposed to the air fully peeled, sufficient for relatively leisurely and practically placing it in the cans.

I claim :—

1. The method of peeling fruit comprising initially softening the skin by subjection to heat, and then immediately removing the softened skin by subjecting the fruit to the action of an aqueous saline solution.

2. The method of peeling fruit comprising initially softening the skin by subjection to steam, and then immediately removing the softened skin by subjecting the fruit to the action of an aqueous saline solution.

3. The method of peeling fruit comprising continuously passing the fruit through a region in which it is subjected to heat adapted to soften its skin, and then immediately and continuously passing it through a region in which it is subjected to an aqueous saline solution adapted to remove the softened skin.

4. The method of peeling fruit comprising continuously passing the fruit through a region in which it is subjected to the action of steam adapted to soften its skin, and then immediately and continuously passing it through a region in which it is subjected to an aqueous saline solution adapted to remove the softened skin.

In testimony whereof I have signed my name to this specification.

ALBERT R. THOMPSON.